Nov. 22, 1955  J. A. TROENDLE  2,724,566
CONTROL ARRANGEMENT FOR AIRCRAFT
Filed Nov. 3, 1952  4 Sheets-Sheet 1

INVENTOR.
JEAN A. TROENDLE
BY
James B. Christie
ATTORNEY

INVENTOR.
JEAN A. TROENDLE

BY James B. Christie

ATTORNEY

United States Patent Office 2,724,566
Patented Nov. 22, 1955

2,724,566

CONTROL ARRANGEMENT FOR AIRCRAFT

Jean A. Troendle, Hollywood, Calif.

Application November 3, 1952, Serial No. 318,357

7 Claims. (Cl. 244—102)

This invention relates to improved methods and means for controlling aircraft during the ground run for a take-off.

In my Patent No. 2,577,385 which issued December 4, 1951, I disclosed methods and apparatus for reducing the air drag exerted on the landing gear of an airplane during take-off.

The arrangements disclosed in the aforesaid patent may be employed on aircraft having various types of landing gear including a nose wheel. During the ground run for the take-off, the nose wheel of the airplane is retracted and the remaining ground support for the airplane is altered so that the airplane is supported at its center of balance. Thus, the air drag due to the nose wheel is eliminated during the latter part of the take-off when the speed of the aircraft is at its maximum. In large aircraft which employ wheels located along more than one axis transverse to the length of the airplane in addition to the nose wheel, all of the wheels except those located at the center of balance of the airplane may be retracted also, thereby further reducing the air drag.

The present invention relates to control arrangements and methods for use in conjunction with the methods and apparatus disclosed in the aforesaid patent. The control arrangements serve to automatically extend the nose wheel and provide ground support rearwardly of the center of gravity of the airplane when the brake control of the airplane is operated during the ground run for a take-off. Thus, the landing gear for the airplane is automatically restored to its initial condition so that the airplane is not damaged if the pilot finds it necessary to apply the brakes of the airplane during the ground run for a take-off. Since the control arrangement is automatic, error on the part of the pilot is precluded.

The invention is explained with reference to the drawings, in which:

Figure 1 shows my invention employed in an airplane having a tricycle landing gear comprising a nose wheel 8 and a pair of wheels 9 which are ordinarily located rearwardly of the center of gravity of the airplane.

Figure 1:
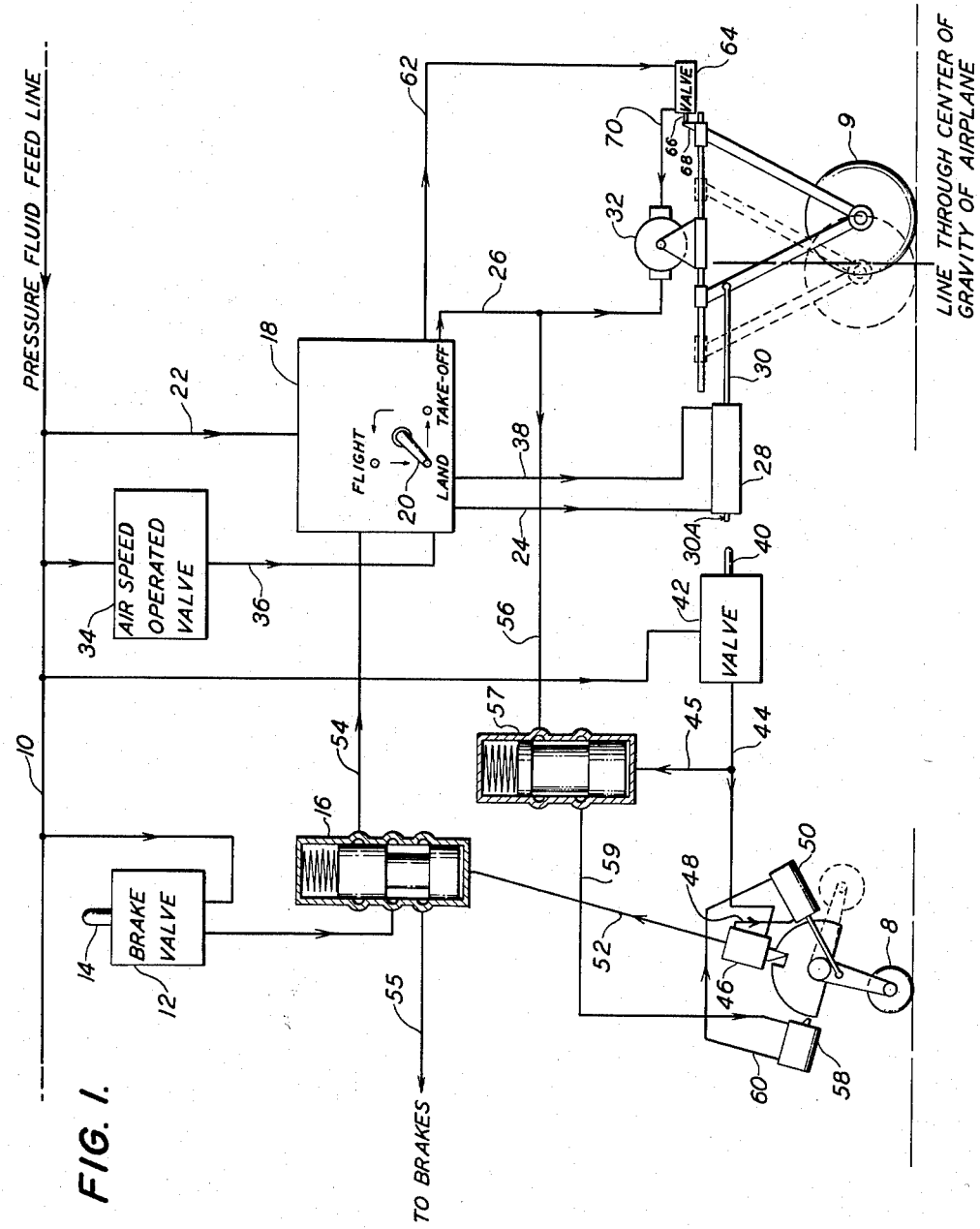
Fig. 1 shows an embodiment of the control arrangement which is suitable for use in aircraft having a landing gear of the tricycle type.

The airplane has a conventional brake valve 12 which is provided with a lever 14 for actuating the brakes of the airplane. The brake valve is connected to receive pressurized fluid from a feed line 10 which is supplied with pressurized fluid from conventional apparatus in the airplane.

The output of the brake valve 12 is applied to a spring loaded three-way valve or distributor 16 which is arranged to permit the pressurized fluid to be applied to the brakes only when the piston of the valve is in the position shown in the drawing. The control apparatus for the valve 16 is arranged so that pressurized fluid may be applied to the brakes only when the nose wheel is extended.

A control box 18 having a lever 20 is provided for controlling the landing gear. The control box is arranged so that the lever 20 can be positioned at any one of the three positions which are designated Land, Take-off, and Flight. The lever 20 is moved by the pilot in the directions indicated by the arrows on the drawing. The apparatus provided in the control box 18 is described below with reference to Figs. 2 and 3. The function of the control box 18 will be described first in order to clarify the description.

Pressurized fluid is applied to the control box 18 through a line 22. The control box is arranged so that when the lever 20 is in the Land position, pressurized fluid is applied through the lines 24 and 26.

The line 24 is connected to one end of an actuating cylinder 28. When pressurized fluid is applied through the line 24, the shaft 30 of the cylinder is positioned so that the rear wheels are located rearwardly of the center of gravity of the airplane, as shown by the solid line position in Fig. 1.

The line 26 is connected to an actuating cylinder 32 which serves to cause the rear landing wheels to be extended and locked in their extended position when pressurized fluid is applied through the line 26.

When the lever 20 is moved to the Take-off position, pressurized fluid is applied only through the line 26 at first. During the ground run for the take-off and as soon as pitch control speed is reached, an air speed operated valve 34 permits pressurized fluid to flow through a line 36 to the control box. This causes pressurized fluid to be applied through a line 38 to the actuating cylinder 28 to move the shaft 30 forward so that the rear wheels are located in the dotted line position shown in Fig. 1.

When the shaft 30 is moved forward, the end 30A of the shaft actuates a control shaft 40 on a valve 42 and causes the valve to transmit pressurized fluid through the lines 44 and 45.

The line 44 is connected to a spring loaded lock 46, for securing the nose wheel in its extended position. The pressurized fluid applied through the line 44 causes the lock to be retracted. The lock 46 is arranged so that when it is retracted, the pressurized fluid is applied through the lock and a line 48 to one end of an actuating cylinder 50. This causes the actuating cylinder 50 to retract the nose wheel 8 to its dotted line position shown in the drawing.

A line 52 is connected between the lock 46 and one end of the valve 16. The lock 46 serves to provide pressurized fluid to the line 52 as long as the lock is retracted. The pressurized fluid which is applied through the line 52 serves to move the piston of the valve 16 upward so that the output of the brake valve is connected to the line 54, and not to the brake line 55.

The line 54 is connected to the control box 18, and when pressurized fluid is applied through the line 54 it causes the lever 20 of the control box to move to the Land position.

The line 26 is also connected to a lock 58 through a line 56, a valve 57, and a line 59. The lock 58 serves to secure the nose wheel in its retracted position, and the lock is arranged to transmit pressurized fluid through a line 60 when the lock is retracted. The line 60 is connected to one end of the actuating cylinder 50, and it serves to cause the actuating cylinder to extend the nose wheel when pressurized fluid is applied to the cylinder through the line 60.

The valve 57 is controlled by the pressurized fluid in the line 45 so that pressurized fluid may be applied through the valve 57 to the lock 58 and the actuating cylinder 50 only when the valve 42 is released.

Thus when the valve 42 is operated by the shaft 30, pressurized fluid is applied only through the line 44 to the controls for the nose wheel. When the valve 42 is released, pressurized fluid is applied only through the line 59 to the controls for the nose wheel.

When the lever 20 is moved to the Flight position, pressurized fluid is applied through the line 24 to cause the rear wheels to be moved to the solid line position shown in the drawings. Pressurized fluid is also applied through a line 62 to a valve 64. The valve 64 has a control shaft 66 which is actuated by an extension 68 which is affixed to the landing gear. The extension 68 serves to actuate the valve 64 when the rear wheels are in solid line position shown in the drawings. When the valve 64 is actuated, pressurized fluid is applied through a line 70 to the actuating cylinder 32, and it causes the rear wheels to be retracted and locked in the retracted position.

In order to conduct a take-off, the lever 20 is initially at the Land position. The pilot then moves the lever 20 to the Take-off position and starts the ground run. When the valve 34 operates, the rear wheels 9 are moved from the position at the rear of the center of gravity of the airplane to a position forward of the center of gravity of the airplane so that these wheels are at the center of balance of the airplane. As soon as the rear wheels are positioned at the center of balance, the nose wheel is retracted.

If the brake valve 12 is operated during the take-off, pressurized fluid is applied through the valves 12 and 16 and the line 54 to the control box 18, and not to the brakes of the airplane. The pressurized fluid in the line 54 causes the lever 20 to move to the Land position. This causes the nose wheel to be extended and also causes the rear wheels 9 to be restored to their initial condition. As soon as the nose wheel is locked in its extended position, the lock 48 ceases to transmit pressurized fluid through the line 52 and the spring load in the valve 16 causes the piston of the valve to move downward. This causes the pressurized fluid which is applied through the valve 12 to be applied to the line 55 so that the brakes of the airplane are actuated.

Figure 2:
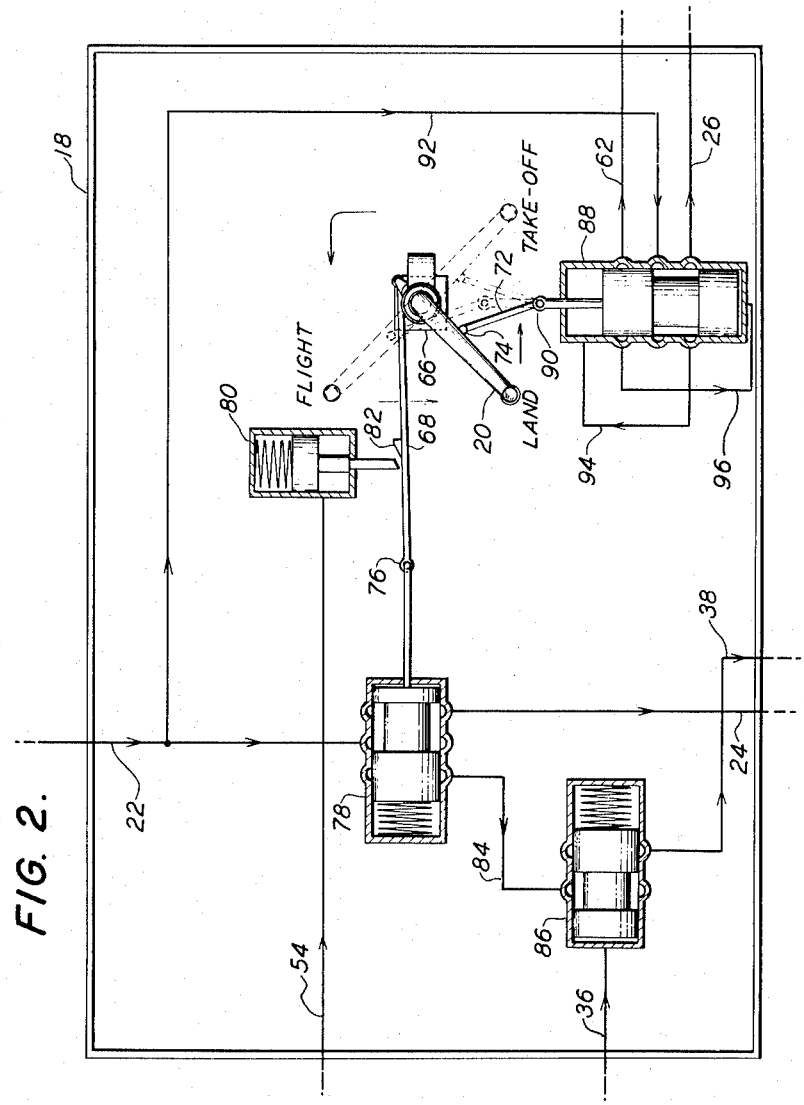
Figs. 2 and 3 show the details of part of the control arrangement which is shown in block diagram form in Fig. 1.
Figure 3:
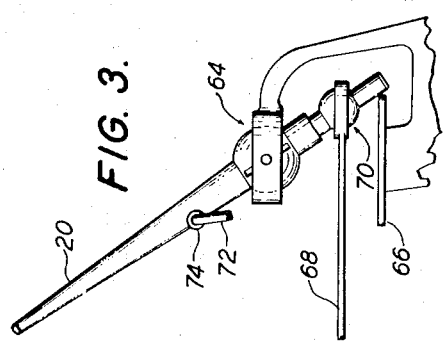

Referring now to Figs. 2 and 3, the control box comprises a lever 20 which is supported by a ball joint 64 so that it is free to move in any desired direction. A plate 66 serves as a guide for controlling the movement of the lever 20. A shaft 68 is coupled to the lower portion of the lever by a ball joint 70. A shaft 72 is coupled to the upper portion of the lever by a ball joint 74.

The shaft 68 is coupled through a ball joint 76 to control a three-way valve 78. The valve 78 is spring loaded and when the lever 20 is not restrained, the spring load in the valve 78 serves to cause the lever to be maintained in the Land position.

The control line 54 is connected to a spring loaded lock 80. The lock is arranged to engage an extension 82 on the shaft 68 so as to maintain the lever 20 in the Take-off position after it has been moved there by the pilot. However, if pressurized fluid is applied to the lock through the line 54, the lock is retracted and the spring load in the valve 78 moves the lever 20 to the Land position. When the lever 20 is moved to the Land position, the landing gear is restored to its initial condition, as described above with reference to Fig. 1. Engagement of the lock 80 does not prevent the lever 20 from being moved from Take-off to Flight position because the plate 66 guides the movement of the lever and causes the shaft 68 to pivot about ball joint 76, carrying the extension 82 on the shaft 68 clear of the lock 80.

The line 24 is connected to one outlet of the valve 78, and the other outlet of this valve is connected through a line 84 to a spring loaded valve 86. The valve 86 is controlled by the pressure of the fluid in the line 36, which line is supplied with fluid through the air speed operated valve 34.

The shaft 72 is connected to operate a three-way valve 88 through a ball joint 90. A line 92 connects the pressure fluid feed line of the airplane to the inlet of the valve 88. A pair of lines 94 and 96 provide hydraulic locks for the valve 88 so that the piston of the valve can be moved only when force is applied by means of the lever 20.

The control box shown in Fig. 2 serves to provide pressurized fluid to the lines 24, 26, 38 and 62 as described above with reference to Fig. 1.

Figure 4:
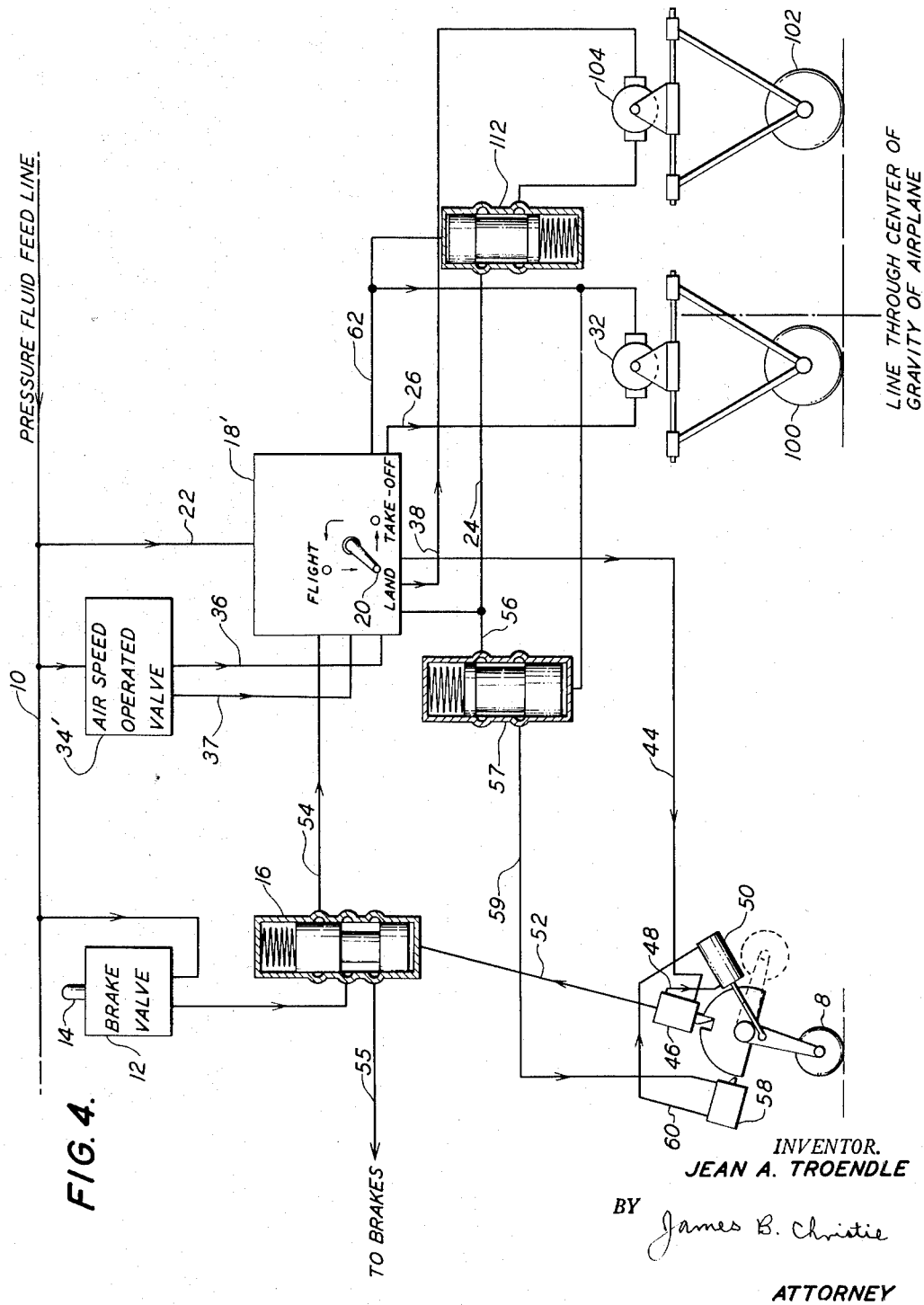
Fig. 4 shows a control arrangement which is suitable for use in aircraft having a landing gear consisting of a nose wheel and two sets of wheels located aft of the nose wheel.

Fig. 4 illustrates how the methods and apparatus of this invention may be employed in larger aircraft. The landing gear shown in Fig. 4 comprises a nose wheel 8 and two sets of wheels 100, 102 located aft of the nose wheel. The set of wheels 100 is located forward of the center of gravity of the airplane and approximately at the center of balance of the airplane during the latter part of the ground run for a take-off. The set of wheels 102 is located aft of the center of gravity of the airplane. In this embodiment of the invention, the location of the ground support is altered during the ground run by retracting the wheels 102, rather than by moving the wheels forward as illustrated in Fig. 1.

Ordinarily it is preferable to retract the nose wheel 8 as soon as pitch control is attained and to retract the wheels 102 during the latter part of the take-off so that the landing gear is de-loaded somewhat and the landing gear and runway will not be damaged by the weight of the airplane.

In the arrangement shown in Fig. 4, the air speed operated valve 34' is provided with two outlet lines 36 and 37. As soon as pitch control speed is attained, the valve 34' causes pressurized fluid to flow through the line 37 to the control box 18'. As soon as the speed at which the wheels 102 are to be retracted is attained, the valve 34' causes pressurized fluid to flow through the line 36.

Figure 5:
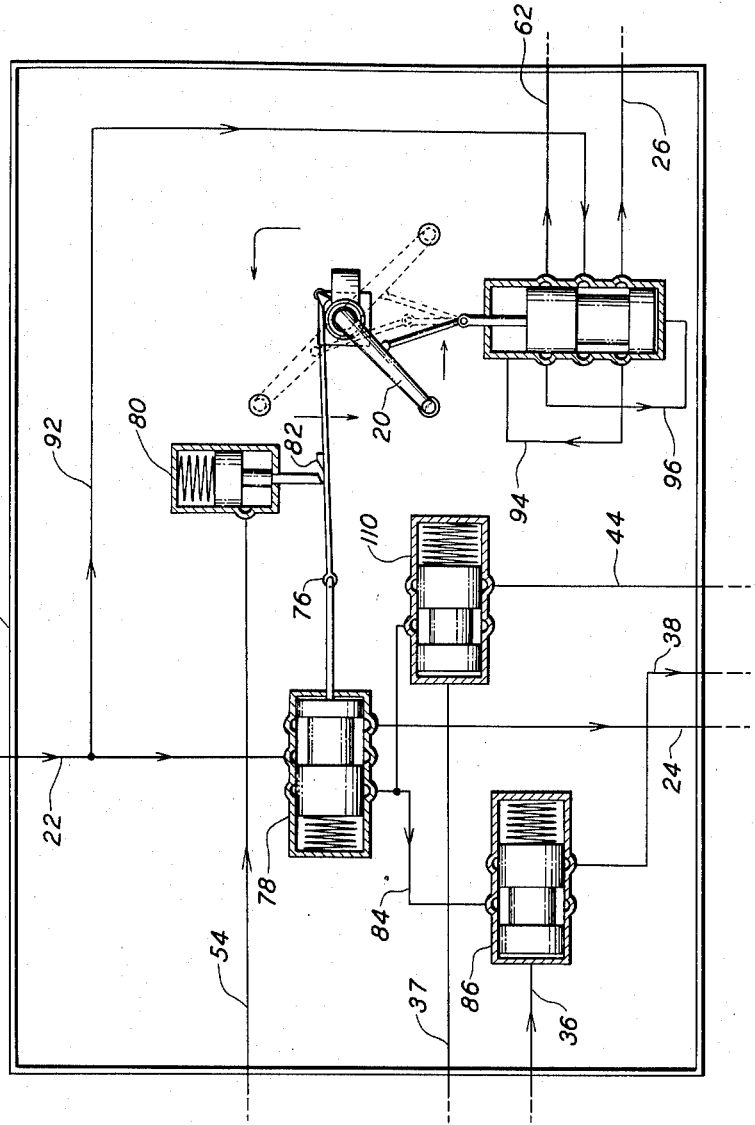
Fig. 5 shows the control box of Fig. 2 modified for use in the control arrangement of Fig. 4.

The control box 18' is the same as the control box 18 of Fig. 2 except that a valve 110 has been added, as shown in Fig. 5. The valve 110 serves to transmit pressurized fluid to the line 44 when it is actuated by pressurized fluid from the valve 34', and the pressurized fluid in the line 44 causes the nose wheel 8 to be retracted as before.

In the embodiment of the invention shown in Fig. 4, the line 59 is connected through the valve 57 to the line 24. The operation of the valve 57 is controlled by the fluid in line 62, so that pressurized fluid is transmitted to the line 59 only when the lever 20 is in the Land position.

Line 38 is connected to one end of an actuating cylinder 104 for retracting the wheels 102.

Line 24 is connected to the other end of the cylinder 104 through a valve 112. The operation of the valve 112 is controlled by the fluid in the line 62 so that pressurized fluid for causing the wheels 102 to be extended is transmitted through the line 24 and the valve 112 only when the lever 20 is in the Land position.

Thus, when pitch control speed is attained during the ground run, the valve 34' applies pressurized fluid through the line 37, and the nose wheel 8 is retracted. When a somewhat higher speed is attained, the valve 34' applies pressurized fluid through the line 38 and the wheels 102 are retracted.

If the brakes are applied during the ground run, pressurized fluid is applied through the line 54 to the control box 18' to cause the lever 20 to move to the Land position. This causes pressurized fluid to be applied through the lines 24 and 59 so that the nose wheel 8 and the rear wheels 102 are extended. The brakes of the airplane cannot be actuated until the nose wheel is fully extended so that no pressurized fluid is applied through the line 52 to the valve 16.

It will be apparent that the method and apparatus of my invention may be employed in aircraft having substantially any type landing gear. It will also be apparent that the invention is not limited to the specific control apparatus shown in the drawings, and that various other arrangements may be employed to restore the landing system to its initial condition when the brake control of the airplane is actuated during the ground run for a take-off.

I claim:

1. In an airplane having means located fore and aft for supporting it on the ground and a braking system comprising brakes, the combination comprising means for deloading the fore support during the ground run for a take-off, and means for retracting the fore support substantially as soon as it is deloaded, and means coupled to the braking system of the airplane for extending the fore support of the airplane when the brake control of the airplane is actuated during the ground run so that the fore support is extended before the brakes of the airplane are actuated.

2. In an airplane having a braking system comprising brakes and a brake control, means located fore and aft for supporting it on the ground, means for deloading the fore support during the ground run for a take-off, means for altering the aft support means during said ground run so that the airplane is supported at its center of balance, and means for retracting the fore support substantially as soon as it is deloaded, the improvement which comprises means coupled to the braking system of the airplane for extending the fore support of the airplane when the brake control of the airplane is actuated during said ground run so that the fore support is extended before the brakes of the airplane are actuated, and means coupled to the braking system of the airplane for restoring the aft support means to its initial condition when the brake control of the airplane is actuated during said ground run.

3. In an airplane having means located fore and aft of the center of gravity of the airplane for supporting the airplane on the ground and a braking system comprising brakes and a brake control, the combination comprising means for retracting the fore support during the ground run for a take-off, means for altering the aft support during said ground run so that the aft support is located forward of the center of gravity of the airplane, and means responsive to the braking system of the airplane for extending the fore support of the airplane prior to actuating the brakes when the brake control of the airplane is actuated during said ground run.

4. In an airplane having a braking system comprising brakes and a brake control, means located fore and aft of the center of gravity of the airplane for supporting the airplane on the ground, means for retracting the fore support during the ground run for a take-off, means for altering the aft support during said ground run so that the aft support is located forward of the center of gravity of the airplane, the improvement which comprises means responsive to the braking system of the airplane for extending the fore support of the airplane prior to actuating the brakes, and means responsive to the braking system of the airplane for restoring the aft support to its initial condition when the brake control of the airplane is actuated during said ground run.

5. In an airplane having a braking system comprising brakes and a brake control, means for supporting the airplane on the ground at the beginning of a take-off fore and aft of the center of gravity of the airplane, means for moving the aft support forward during the ground run for the take-off until the fore support is deloaded, and means for retracting the fore support substantially as soon as it is deloaded, the improvement which comprises means responsive to the braking system of the airplane for extending the fore support of the airplane prior to actuating the brakes when the brake control of the airplane is actuated during said ground run, and means for simultaneously initiating movement of the aft support rearwardly of the center of gravity of the airplane.

6. In an airplane having brakes, means for supporting the airplane on the ground at the beginning of a take-off fore and aft of the center of gravity of the airplane, means for moving the aft support forward during the ground run for the take-off to deload the fore support, and means for retracting the fore support substantially as soon as it is deloaded, a control system comprising a brake control, means coupled to the brake control for extending the fore support of the airplane prior to actuating the brakes when the brake control is actuated during said ground run, means coupled to the brake control for also initiating movement of the aft support rearwardly of the center of gravity of the airplane when the brake control is actuated during said ground run, and means responsive to the brake control for actuating the brakes of the airplane substantially as soon as the fore support is extended.

7. In an airplane having a braking system comprising brakes and a brake control, at least three supports for engaging the ground, one support being located at the nose of the airplane and the other two being located fore and aft of the center of gravity of the airplane, means for retracting the nose support during the ground run for a take-off, and means for retracting the support located aft of the center of gravity of the airplane during said ground run, the improvement which comprises means coupled to the braking system of the airplane for extending the nose support prior to actuating the brakes when the brake control of the airplane is actuated during said ground run, and means coupled to the braking system of the airplane for extending the support located aft of the center of gravity of the airplane when the brake control of the airplane is actuated during said ground run.

References Cited in the file of this patent

UNITED STATES PATENTS

| 2,112,253 | Smith | Mar. 29, 1938 |
| 2,338,046 | Lloyd | Dec. 28, 1943 |
| 2,364,441 | Henry | Dec. 5, 1944 |

FOREIGN PATENTS

| 505,263 | Great Britain | May 4, 1939 |
| 652,819 | Great Britain | May 2, 1951 |